(12) United States Patent
Nakano

(10) Patent No.: US 6,960,622 B2
(45) Date of Patent: Nov. 1, 2005

(54) INK SET

(75) Inventor: Yukihiro Nakano, Wakayama (JP)

(73) Assignee: Kao Corporation, Tokyo (JP)

( * ) Notice: Subject to any disclaimer, the term of this patent is extended or adjusted under 35 U.S.C. 154(b) by 457 days.

(21) Appl. No.: 10/285,515

(22) Filed: Nov. 1, 2002

(65) Prior Publication Data

US 2003/0119942 A1 Jun. 26, 2003

(30) Foreign Application Priority Data

Nov. 1, 2001 (JP) ........................................ 2001-336626

(51) Int. Cl.$^7$ ............................. C09D 11/10; C08K 9/10
(52) U.S. Cl. ...................................... 523/160; 523/205
(58) Field of Search ................................ 523/160, 161, 523/200, 205; 106/31.27, 31.28, 31.6

(56) References Cited

U.S. PATENT DOCUMENTS

| | | | |
|---|---|---|---|
| 5,328,504 A | | 7/1994 | Ohnishi |
| 5,736,606 A | | 4/1998 | Yanagi et al. |
| 5,852,074 A | * | 12/1998 | Tsutsumi et al. ........... 523/161 |
| 6,030,440 A | | 2/2000 | Sekioka et al. |
| 6,031,019 A | | 2/2000 | Tsutsumi et al. |
| 6,034,154 A | | 3/2000 | Kase et al. |
| 6,488,751 B1 | * | 12/2002 | Takemoto ................ 106/31.13 |
| 6,511,173 B2 | * | 1/2003 | Suzuki et al. ................ 347/106 |
| 6,685,311 B2 | * | 2/2004 | Ishikawa et al. ............. 347/100 |
| 6,733,120 B2 | * | 5/2004 | Ogasawara et al. ......... 347/100 |
| 2003/0029355 A1 | * | 2/2003 | Miyabayashi ............ 106/31.27 |
| 2003/0097961 A1 | * | 5/2003 | Yatake et al. ............ 106/31.59 |

FOREIGN PATENT DOCUMENTS

| | | | |
|---|---|---|---|
| EP | 0 732 381 | | 9/1996 |
| JP | 3-163175 | | 7/1991 |
| JP | 8-218015 | | 8/1996 |
| JP | 8-295837 | | 11/1996 |
| JP | 10-67958 | | 3/1998 |
| JP | 2001187853 A | * | 7/2001 |

OTHER PUBLICATIONS

Machine Translation of JP 2001–187853 A (2001).*

* cited by examiner

*Primary Examiner*—Callie Shosho
(74) *Attorney, Agent, or Firm*—Oblon, Spivak, McClelland, Maier & Neustadt, P.C.

(57) ABSTRACT

An ink set comprising (A) a black ink comprising a water-insoluble colorant for black ink and (B) a color ink comprising a water-insoluble colorant for color ink, wherein the difference between the maximum average particle diameter and the minimum average particle diameter of the colorants contained in the water-insoluble colorant for black ink and the water-insoluble colorant for color ink is at most 45 nm. The ink set can be suitably used for an ink set for inkjet recording.

16 Claims, No Drawings

INK SET

BACKGROUND OF THE INVENTION

1. Field of the Invention

The present invention relates to an ink set, and more specifically to an ink set which can be suitably used for an ink set for inkjet recording.

2. Discussion of the Related Art

Inkjet recording is a recording system for forming characters or images, comprising directly jetting ink droplets from very fine nozzles to a recording medium, and depositing the ink droplets on the recording medium. This system has some advantages such that not only the device shows excellent operability at a low level of noise, but also the coloration is facilitated and plain paper can be used as a recording medium. Therefore, this system has been widely used in recent years.

As the ink for inkjet recording, water-based inks have been widely used from the viewpoint of tractability. As a water-based colorant used in the inks, water-soluble dyes have been mainly used from the viewpoints of jetting reliability and coloration. However, there are some defects in the water-based ink containing a water-soluble dye such that storage properties of the printouts, such as water resistance, light fastness and durability would be impaired.

Therefore, recently, a pigment-containing colorant has been gradually used.

However, as is distinct from a dye-containing colorant in which the dye is uniformly dissolved in an ink, the pigment exists ununiformly as particles having a given size in the ink. Therefore, the pigment-containing colorant causes some problems such that the dispersion stability of the pigment-containing colorant is lowered, and that ink clogging in fine nozzles is apt to be generated when the ink is used for inkjet recording. Therefore, in order to improve dispersion stability and prevent ink clogging in the fine nozzles, there have been reported many techniques for controlling the average particle diameter and particle size distribution of a pigment-containing colorant (Japanese Patent Laid-Open Nos. Hei 3-163175, Hei 8-218015, Hei 8-295837, Hei 10-67958, and the like).

However, there arise some problems such that clear images cannot be satisfactorily formed when these pigment-containing colorants are used, although the dispersion stability is improved and ink clogging is prevented in the nozzles. Usually, an ink set comprising a black ink, a yellow ink, a magenta ink and a cyan ink has been used in a printer for inkjet recording for forming fixed images. When a fixed image is formed on a recording medium having a smooth surface with a black ink and color inks having a controlled average particle diameter and particle size distribution as mentioned above, there exist an area having high gloss and an area having low gloss in the different color regions, so that the image quality tends to be impaired.

An object of the present invention is to provide an ink set which gives a printout showing uniform gloss even when the ink is printed on a medium having a smooth surface. Another object of the present invention is to provide an ink set for inkjet recording showing high gloss and being excellent in water resistance, rubbing resistance and high-lighter fastness, nevertheless the ink is a water-based ink.

These and other objects of the present invention will be apparent from the following description.

SUMMARY OF THE INVENTION

According to the present invention, there is provided an ink set comprising (A) a black ink comprising a water-insoluble colorant for a black ink and (B) a color ink comprising a water-insoluble colorant for a color ink, wherein the difference between the maximum average particle diameter and the minimum average particle diameter of the colorants contained in the water-insoluble colorant for a black ink and the water-insoluble colorant for a color ink is at most 45 nm.

DETAILED DESCRIPTION OF THE INVENTION

The ink set of the present invention comprises a black ink and a color ink. The "black ink," as used herein, refers to an ink having a color difference such that the value of $L^*$ is at most 50, that the sum of $a^*$ and $b^*$ is at most 6, that the value of $a^*$ is at least $-2$, and that the value of $b^*$ is at most 5, when the color difference is represented by the CIELAB, which is determined by measuring a reflected light of a printout at a wave length of light of D65/2 with a spectro color meter commercially available from Nippon Denshoku Kogyo K.K. under the trade name of NIPPON DENSHOKU Spectro Color Meter SE 2000. The "color ink" refers to an ink other than the black ink.

The black ink contains a water-insoluble colorant for a black ink. Also, the color ink contains a water-insoluble colorant for a color ink.

The water-insoluble colorant includes:
(1) a dispersion prepared by dispersing a pigment in water with a surfactant, a pigment derivative or a water-soluble polymer (hereinafter referred to as "pigment dispersion");
(2) a self-dispersible pigment in which a hydrophilic group is directly bonded to a pigment or via another atomic group;
(3) an aqueous dispersion of water-insoluble polymer particles containing a pigment or a hydrophobic dye;
and the like. The detailed description of the water-insoluble colorant (hereinafter simply referred to as "colorant") will be given below.

One of the major characteristics according to the present invention resides in that the difference between the maximum average particle diameter and the minimum average particle diameter of the colorants contained in the colorant for a black ink and the colorant for a color ink is at most 45 nm. Since the ink set of the present invention has the above characteristics, the ink set gives a printout uniform gloss, even when these inks are printed on a medium having a smooth surface.

The reason that the ink set of the present invention gives a printout uniform gloss even when printed on a medium having a smooth surface, such as photopaper or gloss paper is that the particle diameters of the colorants contained in the inks are evenly sized.

Referring to the relationship between the particle diameters and the gloss of the colorant, when a solid image having a size of, for instance, 10 cm×10 cm is printed on a medium having a smooth surface, such as photopaper or gloss paper with an ink containing a colorant having a larger particle diameter, the surface roughness of the printout surface increases, i.e. its ruggedness increases, and the gloss decreases. Also, when an ink containing a colorant having a smaller particle diameter is used, the surface roughness of the printout surface decreases, i.e. its ruggedness decreases, and the gloss increases. In other words, as to the uniformity of gloss on a printout surface, when a fixed image is formed on a medium having a smooth surface with several kinds of inks having different color differences with each other, so long as each diameter of the colorants contained in the inks having different color differences with each other falls within a specified range of differences of a particle diameter, a printout surface having uniform gloss can be formed, although the difference in gloss would be caused by the difference in particle diameters. If the particle diameters of the colorants contained in all the inks are large and the difference in particle diameters is within a specified range, a fixed image having uniform mat tone is formed. Also, if the particle diameters of the colorants in the inks are small and the difference in particle diameters is within a specified range, a fixed image having uniform and high gloss is formed.

On the other hand, if the difference between the particle diameter of a colorant used in an ink and the particle diameter of a colorant in another ink is controlled to exceed a specified range, a formed fixed image has an area having low gloss and an area having high gloss, when a fixed image is formed with several kinds of inks having different color differences from each other. Therefore, the printout shows ununiform gloss and a wrong appearance.

Regarding the gloss, many users require image quality showing high gloss similar to photographs. Therefore, the image quality showing high gloss as exhibited by a water-soluble dye has been earnestly desired in a system using a pigment.

The difference in particle diameters of the colorants as referred to herein means a value determined by measuring the average particle diameters of the colorants in each ink used in the ink set, and determining the difference between the maximum average particle diameter and the minimum average particle diameter of the colorants as an absolute value. When the particle size distribution of an ink has plural peaks ascribed to the colorants due to the incorporation of plural colorants into the ink, an average particle diameter for each peak is determined. However, in this case, when the difference in particle diameters is calculated, a peak having a ratio of each peak area to the whole peak area of at most 40% by weight, preferably at most 20% by weight, more preferably at most 10% by weight is excluded from the objects of calculation for the difference in particle diameters. For instance, in a case where there is used an ink set composed of a black ink, a yellow ink, a magenta ink and a cyan ink, each average particle diameter of the colorant contained in each ink is 130 nm for the black ink, 140 nm for the yellow ink, 100 nm for the magenta ink, and 90 nm for the cyan ink, respectively, the difference in particle diameters of the colorants as used herein is determined by calculating the difference between the maximum particle diameter of 140 nm for the yellow ink and the minimum average particle diameter of 90 nm for the cyan ink, and the difference in particle diameters of 50 nm is obtained in an absolute value. The colorant may contain the other colorant having a particle diameter which does not satisfy the difference in particle diameters according to the present invention, in an amount within a range which would not hinder the object of the present invention.

The average particle diameter of the polymer particles used in the present invention is determined by cumulant analysis using a particle size distribution analyzer commercially available from Otsuka Denshi K.K. under the trade name of ELS-8000, as described in the Examples mentioned later.

The gloss of the fixed image formed by using an ink set comprising a combination of several inks having different color differences form each other becomes more uniform, if the particle diameters of the colorants in all the inks become more even. From this viewpoint, the difference of the particle diameters in the colorant for a black ink and the colorant for a color ink is at most 45 nm, preferably at most 40 nm, more preferably at most 35 nm, still more preferably at most 25 nm.

It is desired that each average particle diameter of the colorant for a black ink and the colorant for a color ink is 10 to 200 nm, preferably 30 to 180 nm, more preferably 50 to 150 nm, still more preferably 70 to 130 nm, respectively, from the viewpoints of improving dispersion stability, increasing optical density and obtaining high gloss.

Among the colorants, an aqueous dispersion of water-insoluble polymer particles containing a pigment or a hydrophobic dye is preferably used, from the viewpoints of water resistance, rubbing resistance and high-lighter fastness.

The pigment used in the pigment dispersion can be any of an inorganic pigment and an organic pigment. The pigment can be used together with an extender as occasion demands.

The inorganic pigment includes carbon black, metal oxides, metal sulfides and the like.

In the case of the colorant for a black ink, the pigment is preferably a black pigment such as carbon black. The carbon black includes furnace black, thermal lamp black, acetylene black, channel black and the like.

In the case of the colorant for a color ink, the pigment is preferably a colored pigment such as an organic pigment or an extender. The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The extender includes silica, calcium carbonate, talc and the like.

The surfactant for dispersing a pigment includes anionic surfactants, cationic surfactants, nonionic surfactants and amphoteric surfactants. Among them, the surfactants are preferably a sodium salt of a condensate of β-naphthalenesulfonic acid and formalin (for instance, those commercially available from Kao Corporation under the trade names of Demol N, Demol RN, Demol MS, and the like); and carboxylic acid-based polymer surfactants (for instance, those commercially available from Kao Corporation under the trade names of Poise 520, Poise 521, Poise 530, and the like) from the viewpoints of dispersion stability and jetting property.

It is desired that the amount of the surfactant is 1 to 120 parts by weight, preferably 3 to 70 parts by weight, more preferably 5 to 30 parts by weight, based on 100 parts by weight of the pigment, from the viewpoints of dispersion stability of the colorant in the ink and jetting property of the ink.

The pigment derivative used for dispersing a pigment in water includes azo derivatives, diazo derivatives, phthalocyanine derivatives, quinacridone derivatives, isoindolinone derivatives, dioxazine derivatives, perylene derivatives, perinone derivatives, thioindigo derivatives, anthraquinone derivatives, quinophthalone derivatives and the like, which have an ionic functional group or a salt of an ionic functional group.

The water-soluble polymer used for dispersing a pigment in water includes water-soluble vinyl polymers, water-soluble ester polymers, water-soluble urethane polymers, and the like. Among these polymers, the water-soluble vinyl polymers are preferable.

The "water-soluble polymer," as used herein, means that a polymer which dissolves in water in an amount of 1 g to 100 g at 25° C. after neutralization. Also, the "water-insoluble polymer," as used herein, refers to a polymer other than the above-mentioned water-soluble polymer.

The water-soluble vinyl polymers include copolymers prepared by polymerizing a monomer composition comprising a monomer (a) having a salt-forming group and a hydrophobic monomer (b). This monomer composition may contain a nonionic hydrophilic monomer (c) as occasion demands.

The monomer (a) having a salt-forming group includes anionic monomers and cationic monomers.

Examples of the anionic monomer include unsaturated carboxylic acid monomers, unsaturated sulfonic acid monomers, unsaturated phosphoric acid monomers, and the like. Among them, unsaturated carboxylic acid monomers are preferable, and acrylic acid and methacrylic acid are more preferable.

Examples of the cationic monomer include tertiary amine-containing unsaturated monomers, ammonium salt-containing unsaturated monomers, and the like. Concrete examples of the cationic monomer include N,N-dimethylaminoethyl (meth)acrylate, N-(N',N'-dimethylaminopropyl) (meth)acrylamide, vinylpyrrolidone, methacryloyloxyethyltrimethylammoniummethyl sulfate, methacryloyloxyethyldimethylethylammoniumethyl sulfate, and the like. Among them, N,N-dimethylaminoethyl (meth) acrylate is preferable.

The hydrophobic monomer (b) includes (meth)acrylates such as methyl (meth)acrylate, ethyl (meth)acrylate, (iso) propyl (meth)acrylate, (iso or tertiary)butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate; styrenic monomers such as styrene, vinyltoluene, 2-methylstyrene and chlorostyrene; and the like. These monomers can be used alone or in admixture of at least two kinds. Incidentally, the above-mentioned "(iso or tertiary)butyl" and "(iso)" include the case where these groups are present and the case where these groups are absent. When these groups are absent, the monomer is in the form of normal.

The nonionic monomer (c) includes 2-hydroxyethyl (meth)acrylate, 3-hydroxypropyl (meth)acrylate, polyethylene glycol (n=2–30) (meth)acrylates, poly(ethylene glycol (n=1–15)/propylene glycol (n=1–15)) (meth)acrylates; C1–12 monoalkoxypolyethylene glycol (n=2–30) (meth) acrylates, and the like. Among them, 2-hydroxyethyl (meth) acrylate and C1–12 monoalkoxypolyethylene glycol (n=2–30) (meth)acrylates are preferable.

The ratio of the monomer (a) having a salt-forming group, the hydrophobic monomer (b) and the nonionic hydrophilic monomer (c) is not limited to specified ones, as long as these monomers are water-soluble after neutralization, and an obtained ink is excellent in dispersion stability of colorant and jetting property. It is preferable that the ratio of the monomer (a) having a salt-forming group/hydrophobic monomer (b)/nonionic hydrophilic monomer (c) (weight ratio) is usually 1–80/20–70/0–50.

It is desired that the weight-average molecular weight of the water-soluble polymer is 500 to 30000, preferably 800 to 20000, more preferably 1000 to 10000, taking account of dispersion stability of the colorant in the ink and ink viscosity. Incidentally, the weight-average molecular weight of the water-soluble polymer is a value prior to neutralization as determined by gel chromatography described in Examples shown below.

It is desired that the water-soluble polymer is neutralized. The neutralization degree is not limited to specified ones, as long as the dispersion stability of the pigment dispersion can be sufficiently maintained. It is desired that the neutralizing agent is usually added in an amount of 30 to 200% by mol per 1 mol of the salt-forming group of the monomer having a salt-forming group, which constitutes the water-soluble polymer.

The neutralizing agent used for neutralization may be appropriately selected depending upon the kind of the salt-forming group of the water-soluble polymer. For instance, when a cationic monomer is used as the water-soluble polymer, acetic acid, methoxyacetic acid, propionic acid, lactic acid, succinic acid, glycollic acid, gluconic acid, glyceric acid or the like can be used as the neutralizing agent. Also, when an anionic monomer is used as the water-soluble polymer, a tertiary amine such as trimethylamine or triethylamine, sodium hydroxide, potassium hydroxide, lithium hydroxide, ammonia or the like can be used as the neutralizing agent.

It is desired that the amount of the pigment derivative or the water-soluble polymer is 5 to 100 parts by weight, preferably 10 to 80 parts by weight, more preferably 15 to 60 parts by weight, based on 100 parts by weight of the pigment, from the viewpoints of dispersion stability of the colorant in the ink and jetting property of the ink.

The self-dispersible pigment in which a hydrophilic group is directly bonded to the pigment or via an atomic group, includes self-dispersible pigments as disclosed in Japanese Patent Laid-Open No. Hei 10-140064, Japanese Patent Laid-Open No. Hei 10-110127 and the like. Concrete examples of the self-dispersible pigment include a pigment commercially available from Cabot Corporation under the trade name of CAB-O-JET (registered trademark) 300.

The pigment used in the aqueous dispersion of the water-insoluble polymer particles containing a pigment or a hydrophobic dye can be the same as those used in the above-mentioned pigment dispersion.

Examples of the hydrophobic dye include oil-soluble dyes, disperse dyes and the like. Among them, oil-soluble dyes and disperse dyes are preferable because they can be satisfactorily contained in the polymer particles.

The oil-soluble dyes are not limited to specified ones, and include, for instance, C.I. Solvent Black 3, 7, 27, 29 and 34; C.I. Solvent Yellow 14, 16, 29, 56 and 82; C.I. Solvent Red 1, 3, 8, 18, 24, 27, 43, 51, 72 and 73; C.I. Solvent Violet 3; C.I. Solvent Blue 2, 11 and 70; C.I. Solvent Green 3 and 7; C.I. Solvent Orange 2; and the like.

The disperse dyes are not limited to specified ones. Preferable examples of the disperse dye include C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9; and the like.

The hydrophobic dye is desirably a hydrophobic dye which dissolves in an organic solvent at 25° C. in an amount of at least 2 g/L, preferably 20 to 500 g/L, from the viewpoint of efficiently containing the hydrophobic dye in the water-insoluble polymer particles.

The water-insoluble monomer used for containing a pigment or dye in the water-insoluble polymer includes water-insoluble vinyl polymers, water-insoluble ester-based polymers, water-insoluble urethane-based polymers, and the like. Among these polymers, the water-insoluble vinyl polymers are preferable.

The water-insoluble vinyl polymer includes a copolymer prepared by polymerizing a monomer composition comprising a monomer having a salt-forming group (a) and a hydrophobic monomer (b). Incidentally, the monomer composition may contain a nonionic hydrophilic monomer (c) and/or a macromer (d) as occasion demands. Among them, it is preferable that the macromer (d) is copolymerized with these monomers from the viewpoints of dispersion stability of the colorant in the ink and jetting stability of the ink.

As the monomer having a salt-forming group (a), the hydrophobic monomer (b) and the nonionic hydrophilic monomer (c), there can be exemplified the same monomers as those used for the above-mentioned water-soluble polymer.

The macromer (d) includes macromers such as monomers having a polymerizable unsaturated group and a number-average molecular weight of 500 to 100000, preferably 1000 to 10000. The number-average molecular weight of the macromer (d) is determined by gel chromatography using polystyrene as a standard substance and chloroform containing 1 mmol/L dodecylmethylamine as a solvent.

Representative examples of the macromer (d) include a silicone macromer and a styrenic macromer. Those macromers may be used alone or in admixture thereof.

Among the silicone macromers, a silicone macromer represented by the formula (I):

$$X^1(Y^1)_q Si(R^1)_{3-r}(Z^1)_r \quad (I)$$

wherein $X^1$ is a polymerizable unsaturated group; $Y^1$ is a divalent group; each of $R^1$ is independently hydrogen atom, a lower alkyl group having 1 to 5 carbon atoms, an aryl group having 6 to 10 carbon atoms or an alkoxy group having 2 to 12 carbon atoms; $Z^1$ is a monovalent siloxane polymer residue having a number-average molecular weight of at least 500; q is 0 or 1; and r is an integer of 1 to 3, can be favorably used from the viewpoint of preventing scorching on the printer head of an inkjet printer.

In the silicone macromer represented by the formula (I), $X^1$ includes a monovalent unsaturated hydrocarbon group having 2 to 6 carbon atoms, such as $CH_2=CH-$ group or $CH_2=C(CH_3)-$ group. $Y^1$ includes a divalent group such as $-COO-$ group, a $-COOC_{a1}H_{2a1}-$ group wherein $a_1$ is an integer of 1 to 5, or phenylene group. Among them, $-COOC_3H_6-$ is preferable. $R^1$ includes hydrogen atom; a lower alkyl group having 1 to 5 carbon atoms, such as methyl group and ethyl group; an aryl group having 6 to 20 carbon atoms, such as phenyl group; an alkoxy group having 1 to 20 carbon atoms, such as methoxy group; and the like. Among them, methyl group is preferable. $Z^1$ is preferably a monovalent dimethylsiloxane polymer residue having a number-average molecular weight of 500 to 5000. q is 0 or 1, and preferably 1. r is an integer of 1 to 3, and preferably 1.

Representative examples of the silicone macromer include a silicone macromer represented by the formula (I-1):

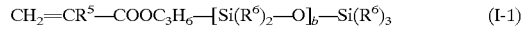
$$CH_2=CR^5-COOC_3H_6-[Si(R^6)_2-O]_b-Si(R^6)_3 \quad (I-1)$$

wherein $R^5$ is hydrogen atom or methyl group; each of $R^6$ is independently hydrogen atom or a lower alkyl group having 1 to 5 carbon atoms; and b is a number of 5 to 65;
a silicone macromer represented by the formula (I-2):

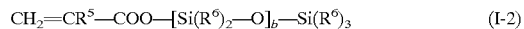
$$CH_2=CR^5-COO-[Si(R^6)_2-O]_b-Si(R^6)_3 \quad (I-2)$$

wherein $R^5$, $R^6$ and b are the same as defined above;
a silicone macromer represented by the formula (1-3):

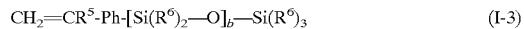
$$CH_2=CR^5\text{-Ph-}[Si(R^6)_2-O]_b-Si(R^6)_3 \quad (I-3)$$

wherein Ph is phenylene group; and $R^5$, $R^6$ and b are the same as defined above;
a silicone macromer represented by the formula (I-4):

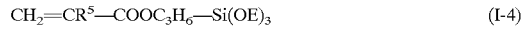
$$CH_2=CR^5-COOC_3H_6-Si(OE)_3 \quad (I-4)$$

wherein $R^5$ is the same as defined above; E is a group represented by the formula: $-[Si(R^5)_2O]_c-Si(R^5)_3$, wherein $R^5$ is the same as defined above, and c is a number of 5 to 65; and the like.

Among them, the silicone macromer represented by the formula (I-1) is preferable, and a silicone macromer represented by the formula (I-1a):

$$CH_2=C(CH_3)-COOC_3H_6-[Si(CH_3)_2-O]_d-Si(CH_3)_3 \quad (I-1a)$$

wherein d is a number of 8 to 40, is especially preferable. Examples of the silicone macromer include a silicone macromer manufactured by CHISSO CORPORATION under the trade name of FM-0711, and the like.

The styrenic macromer can be favorably used, from the viewpoint of sufficiently incorporating the pigment into the vinyl polymer.

Representative examples of the styrenic macromer include styrene homopolymers having a polymerizable functional group at one end, or copolymers of styrene with the other monomer. Among them, those having acryloyloxy group or methacryloyloxy group as a polymerizable functional group at one end are preferable.

It is desired that the content of styrene in the copolymer of styrene with the other monomer is at least 60% by weight, preferably at least 70% by weight, from the viewpoint of sufficiently incorporating the pigment into the vinyl polymer. The other monomer includes acrylonitrile, and the like.

It is desired that the content of the monomer (a) having a salt-forming group in the water-insoluble vinyl polymer is 1 to 50% by weight, preferably 2 to 40% by weight, from the viewpoint of dispersion stability of the dispersion.

It is desired that the content of the hydrophobic monomer (b) in the water-insoluble vinyl polymer is 5 to 93% by weight, preferably 10 to 80% by weight, from the viewpoints of optical density and dispersion stability.

It is desired that the content of the nonionic hydrophilic monomer (c) in the water-insoluble vinyl polymer is 0 to 40% by weight, preferably 5 to 30% by weight, from the viewpoints of jetting stability and optical density.

It is desired that the content of the macromer (d) in the water-insoluble vinyl polymer is 0 to 30% by weight, preferably 1 to 25% by weight, more preferably 5 to 20% by weight, from the viewpoints of suppression of scorching on the heater surface of an inkjet printer and dispersion stability.

The weight-average molecular weight of the water-insoluble polymer is 1000 to 100000, preferably 1500 to 100000, more preferably 2000 to 7000, taking account of influence on dispersion stability of the colorant and ink viscosity. The weight-average molecular weight of the water-insoluble polymer is determined in the same manner as the water-soluble polymer mentioned above.

It is preferable that the water-insoluble polymer is neutralized. The neutralization degree is not limited to specified ones, as long as the dispersion stability is satisfactory. It is desired that 30 to 200% by mol of the neutralizing agent is usually added per 1 mol of the salt-forming group of the monomer (a) having a salt-forming group, which constitutes the water-insoluble polymer.

The neutralizing agent used for neutralization can be appropriately selected depending upon the kind of the salt-forming group of the water-insoluble polymer. Examples of the neutralizing agent can be the same as those used for the water-soluble polymer.

It is desired that the amount of the water-insoluble polymer is 5 to 250 parts by weight, preferably 10 to 180 parts by weight, more preferably 15 to 130 parts by weight, based on 100 parts by weight of the pigment or the hydrophobic dye, from the viewpoints of dispersion stability of the colorant in the ink, and a balance between jetting property, rubbing resistance and high-lighter fastness.

A process for preparing an aqueous dispersion of the water-insoluble polymer particles containing a pigment or a hydrophobic dye as the colorant is explained below.

The water-insoluble polymer can be prepared by polymerizing a monomer composition comprising the monomer (a) having a salt-forming group, the hydrophobic monomer (b), and if necessary, the nonionic hydrophilic monomer (c) and/or the macromer (d) by a polymerization method such as a bulk polymerization method, a solution polymerization method, a suspension polymerization method or an emulsion polymerization method. Among these polymerization methods, the solution polymerization method is preferable.

The solvent used in the solution polymerization method is preferably a polar organic solvent. When the polar organic solvent is a water-miscible organic solvent, the water-miscible organic solvent can also be used in admixture with water.

The polar organic solvent includes, for instance, aliphatic alcohols having 1 to 3 carbon atoms, such as methanol, ethanol and (iso)propanol; ketones such as acetone, methyl ethyl ketone and methyl isobutyl ketone; esters such as ethyl acetate; and the like. Among them, methanol, ethanol, acetone, methyl ethyl ketone or a mixed solvent thereof with water is preferable.

A radical polymerization initiator can be used in the polymerization. The radical polymerization initiator includes azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile); and organic peroxides such as t-butyl peroxyoctoate, di-t-butyl peroxide and dibenzoyl oxide.

It is desired that the amount of the polymerization initiator is 0.001 to 5 parts by weight, preferably 0.01 to 2 parts by weight, based on 100 parts by weight of the monomer composition.

Incidentally, in the polymerization, a polymerization chain transfer agent can be used. Concrete examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those polymerization chain transfer agents can be used alone or in admixture of at least two kinds.

The conditions for polymerizing the monomer composition cannot be absolutely determined because the conditions differ depending upon kinds of the radical polymerization initiator, the monomers and the solvent used, and the like. The polymerization temperature is usually 30° to 100° C., preferably 50° to 80° C., and that the polymerization time is usually 1 to 20 hours. It is preferable that the atmosphere for polymerization is an inert gas such as nitrogen gas.

After the termination of the polymerization reaction, the polymer can be isolated from the reaction solution by a known method such as re-precipitation or solvent distillation. Also, unreacted monomers and the like can be removed from the resulting copolymer to purify by the repeat of re-precipitation, membrane separation, a chromatographic method, an extraction method or the like.

The aqueous dispersion of the polymer particles containing a hydrophobic dye can be prepared by a known emulsification method. The aqueous dispersion can be obtained, for instance, by dissolving the water-insoluble polymer and the hydrophobic dye in an organic solvent, adding a neutralizing agent as occasion demands to the resulting solution to ionize the salt-forming group of the water-insoluble polymer, adding water thereto, thereafter dispersing the resulting solution as occasion demands by a disperser or an ultrasonic emulsifier, and distilling off the organic solvent to phase-invert to a water-based system.

The aqueous dispersion of the water-insoluble polymer particles containing a pigment can be obtained, for instance, by dissolving the water-insoluble polymer in an organic solvent, adding the pigment, water and a neutralizing agent and a surfactant as occasion demands to the resulting solution, kneading the resulting mixture to give a paste, diluting the paste with water as occasion demands, and distilling off the organic solvent to give a water-based system.

It is desired that each content of the colorants in the black ink and the color ink is 0.5 to 30% by weight, preferably 1 to 20% by weight, more preferably 2 to 15% by weight, respectively, from the viewpoints of sufficient optical density and jetting property. When the colorant is a dispersion, the amount of the colorant is equal to the amount of solid matters of the dispersion.

There can be added to the black ink and the color ink, various additives, for instance, a wetting agent such as polyhydric alcohols, a dispersant, a defoaming agent, a mildewproof agent and/or a chelating agent, a pH adjusting agent and the like in appropriate amounts.

EXAMPLES

Preparation Examples 1 to 4

A reaction vessel was charged with 20 parts by weight of methyl ethyl ketone, and monomers and a polymerization chain transfer agent listed in the column of "initially charged monomers" of Table 1. Thereafter, nitrogen gas replacement was sufficiently carried out.

On the other hand, a dropping funnel was charged with monomers and a polymerization chain transfer agent listed in the column of "dropping monomers" of Table 1, 60 parts by weight of methyl ethyl ketone and a solution prepared by dissolving 0.1 parts by weight of 2,2'-azobis(2,4-dimethylvaleronitrile) in 5 parts by weight of methyl ethyl ketone. The temperature of the mixture in the reaction vessel was increased to 70° C., and the mixture in the dropping funnel was added dropwise to the mixture in the reaction vessel over a period of 2 hours. Thereafter, the resulting mixture was polymerized at 70° C. for 3 hours, and aged at 75° C. for 10 hours to give a polymer solution.

A part of the resulting polymer solution was taken out from the reaction vessel, and its weight-average molecular weight was determined by gel permeation chromatography using polystyrene as a standard substance, and chloroform containing dodecyldimethylamine of 1 mmol/L as a solvent. As a result, the polymer had a weight-average molecular weight as shown in Table 1.

Preparation Examples 5 to 20 (Preparation of Colorant for Pigment-Containing Ink)

A pigment, methyl ethyl ketone, ion-exchanged water and a neutralizing agent listed in Table 2 were added to 28 parts by weight of the polymer solution obtained in Preparation Examples 1 to 4 (solid content of the polymer: 50% by weight), and the resulting mixture was sufficiently stirred. Thereafter, the mixture was kneaded twenty times using a triple-roll mill commercially available from NORITAKE CO., LIMITED under the trade name of NR-84A.

The resulting paste was added to 250 parts by weight of ion-exchanged water, and the mixture was sufficiently stirred. Thereafter, methyl ethyl ketone and a part of water were distilled off using an evaporator, to give a colorant for an ink, the solid content of which was 20% by weight. The average particle diameter of the resulting colorant for an ink is shown in Table 2.

The average particle diameter was determined by cumulant analysis using a particle size distribution analyzer commercially available from Otsuka Denshi K.K. under the trade name of ELS-8000. As the determination conditions, temperature of 25° C., angle between the incident beam and a detector of 90°, total integrated count of 100 counts, a refractive index (1.333) of water which was used as a dispersing solvent were inputted to the particle size distribution analyzer. As a standard substance, one commercially available from Seradyn under the trade name of Uniform Microparticles (particle diameter: 204 nm) was used. The results are shown in Table 2.

The colorants obtained in Preparation Examples 5 to 8 are pigment dispersions in which the pigment is dispersed with a water-soluble polymer, since the polymer containing the colorant obtained in Preparation Examples 5 to 8 exhibits water solubility when the salt-forming group, i.e. the acrylic acid moiety of the polymer was neutralized in the kind and amount of the neutralizing agent as shown in Table 2.

The colorants obtained in Preparation Examples 9 to 20 are aqueous dispersions of pigment-containing water-insoluble polymer particles, since the polymer containing the colorant obtained in Preparation Examples 9 to 20 exhibits water insolubility when the salt-forming groups, i.e. the methacrylic acid, acrylic acid and dimethylaminoethyl methacrylate moieties of the polymer were neutralized in the kind and amount of the neutralizing agent shown in Table 2.

Preparation Examples 21 to 24 (Preparation of Colorant for Hydrophobic Dye-Containing Ink)

A hydrophobic dye shown in Table 2 and 230 parts by weight of toluene were added to 28 parts by weight of the polymer solution obtained in Preparation Example 2 (solid content of polymer: 50% by weight). After the hydrophobic dye was thoroughly dissolved, a neutralizing agent shown in Table 2 was added thereto to neutralize a salt-forming group of the polymer. Nine-hundred parts by weight of ion-exchanged water was further added thereto, and the mixture was stirred. Thereafter, the mixture was dispersed by Microfluidizer (commercially available from Microfluidizer Corp.) for 30 minutes.

Methyl ethyl ketone and a part of water were distilled off from the resulting dispersion by using an evaporator, to give a colorant for an ink, the solid content of which was 20% by weight. The average particle diameter of the resulting colorant for an ink is shown in Table 2.

The colorants obtained in Preparation Examples 21 to 24 are aqueous dispersions of hydrophobic dye-containing water-insoluble polymer particles, since methacrylic acid used in the polymer exhibits water insolubility when the neutralizing agent is used in the kind and amount shown in Table 2.

Each name listed in Tables 1 and 2 means the followings:
Silicone macromer: commercially available from CHISSO CORPORATION under the trade name of FM-0711 (number-average molecular weight: 1000) [which has a structure represented by the formula (I-1a)]
Styrenic macromer: commercially available from TOAGOSEI CO., LTD. under the trade name of AS-6 (styrene homopolymerized macromer having a polymerizable functional group of methacryloyloxy group at one end, number-average molecular weight: 6000)
Monomethoxypolyethylene glycol(n=4) methacrylate: commercially available from Shin-Nakamura Chemical Co., Ltd. under the trade name of NK ESTER M-40G
CB-1: carbon black [commercially available from Degussa under the trade name of Printex 95]
M-1: magenta pigment [commercially available from Ciba Specialty Chemicals K.K. under the trade name of IRGAPHOR Magenta DMQ]
Y-1: yellow pigment [commercially available from SANYO COLOR WORKS, LTD. under the product number of 7410]
C-1: cyan pigment [commercially available from DAINIPPON INK & CHEMICALS, INC. under the trade name of Fastogen Blue TGR-SD]
CB-2: carbon black [commercially available from Degussa under the trade name of Color Black FW18]
M-2: magenta pigment [commercially available from DAINIPPON INK & CHEMICALS, INC. under the trade name of Fastogen Super Magenta RG]
Y-2: yellow pigment [commercially available from Ciba Specialty Chemicals K.K. under the trade name of Yellow 8G-CF(KO1)]
C-2: cyan pigment [commercially available from DAINIPPON INK & CHEMICALS, INC. under the trade name of Fastogen Blue TGR]
CB-3: black dye [commercially available from Orient Chemical Co., Ltd. under the trade name of Oil Black 860]
M-3: magenta dye [commercially available from Orient Chemical Co., Ltd. under the trade name of Oil Pink 312]
Y-3: yellow dye [commercially available from Orient Chemical Co., Ltd. under the trade name of VALIFAST Y 1101]
C-3: cyan dye [commercially available from Clariant (Japan) K.K. under the trade name of Savinyl Blue GLS].

TABLE 1

| Prep. Ex. No. | Initially Charged Monomers | Dropping Monomers | Weight-Average Molecular Weight |
|---|---|---|---|
| 1 | Acrylic acid [12] Styrene [18] Mercaptoethanol [1.1] | Acrylic acid [14] Styrene [32.3] Mercaptoethanol [2.6] | 1800 |
| 2 | Methacrylic acid [4] 2-Hydroxyethyl Methacrylate [4] Styrene [19] Styrenic Macromer [5.3] Mercaptoethanol [0.7] | Methacrylic acid [8] 2-Hydroxyethyl Methacrylate [6] Styrene [29.5] Styrenic Macromer [2] Mercaptoethanol [1.5] | 18500 |
| 3 | Acrylic acid [4] Styrene [26.6] Silicone Macromer [8] Mercaptoethanol [0.9] | Acrylic acid [7] Styrene [30] Silicone Macromer [1.5] Mercaptoethanol [2.0] | 11000 |
| 4 | Dimethylaminoethyl Methacrylate [7] Monomethoxypolyethylene Glycol(n = 4) Methacrylate [7] Styrene [17.2] Styrenic Macromer [7] Dodecylmercaptan [0.8] | Dimethylaminoethyl Methacrylate [8] Monomethoxypolyethylene Glycol(n = 4) Methacrylate [7] Styrene [21.5] Styrenic Macromer [3] Dodecylmercaptan [1.5] | 32000 |

(Note)
The amount of each component inside parenthesis [] represents parts by weight.

TABLE 2

| Prep. Ex. No. | Polymer | Dye/Pigment | Methyl Ethyl Ketone | Ion-Exchanged Water | Neutralizing Agent | Average Particle Diameter (nm) | Property of Polymer |
|---|---|---|---|---|---|---|---|
| 5 | Prep. Ex. 1 | CB-1 [23] | [30] | [5] | 30% Aq. NaOH [8.4] | 94 | Soluble in Ink Medium after Neutralization |
| 6 | Prep. Ex. 1 | M-1 [23] | [30] | [5] | 30% Aq. NaOH [8.4] | 83 | Soluble in Ink Medium after Neutralization |
| 7 | Prep. Ex. 1 | Y-1 [23] | [30] | [5] | 30% Aq. NaOH [8.4] | 72 | Soluble in Ink Medium after Neutralization |
| 8 | Prep. Ex. 1 | C-1 [23] | [30] | [5] | 30% Aq. NaOH [8.4] | 86 | Soluble in Ink Medium after Neutralization |
| 9 | Prep. Ex. 2 | CB-1 [23] | [30] | [30] | 30% Aq. NaOH [2.9] | 95 | Insoluble in Ink Medium after Neutralization |
| 10 | Prep. Ex. 2 | M-1 [23] | [30] | [5] | 30% Aq. NaOH [2.9] | 83 | Insoluble in Ink Medium after Neutralization |
| 11 | Prep. Ex. 2 | Y-1 [23] | [30] | [5] | 30% Aq. NaOH [2.9] | 85 | Insoluble in Ink Medium after Neutralization |
| 12 | Prep. Ex. 2 | C-1 [23] | [30] | [5] | 30% Aq. NaOH [2.9] | 86 | Insoluble in Ink Medium after Neutralization |
| 13 | Prep. Ex. 3 | CB-2 [23] | [30] | [30] | 30% Aq. NaOH [3.2] | 121 | Insoluble in Ink Medium after Neutralization |
| 14 | Prep. Ex. 3 | M-2 [23] | [30] | [5] | 30% Aq. NaOH [3.2] | 152 | Insoluble in Ink Medium after Neutralization |
| 15 | Prep. Ex. 3 | Y-2 [23] | [30] | [5] | 30% Aq. NaOH [3.2] | 128 | Insoluble in Ink Medium after Neutralization |
| 16 | Prep. Ex. 3 | C-2 [23] | [30] | [5] | 30% Aq. NaOH [3.2] | 118 | Insoluble in Ink Medium after Neutralization |
| 17 | Prep. Ex. 4 | CB-1 [23] | [30] | [30] | 30% Aq. AcOH* [3.5] | 143 | Insoluble in Ink Medium after Neutralization |
| 18 | Prep. Ex. 4 | M-1 [23] | [30] | [5] | 30% Aq. AcOH [3.5] | 102 | Insoluble in Ink Medium after Neutralization |
| 19 | Prep. Ex. 4 | Y-1 [23] | [30] | [5] | 30% Aq. AcOH [3.5] | 128 | Insoluble in Ink Medium after Neutralization |
| 20 | Prep. Ex. 4 | C-1 [23] | [30] | [5] | 30% Aq. AcOH [3.5] | 122 | Insoluble in Ink Medium after Neutralization |
| 21 | Prep. Ex. 2 | CB-3 [23] | [0] | [0] | 30% Aq. NaOH [2.9] | 91 | Insoluble in Ink Medium after Neutralization |
| 22 | Prep. Ex. 2 | M-3 [23] | [0] | [0] | 30% Aq. NaOH [2.9] | 83 | Insoluble in Ink Medium after Neutralization |
| 23 | Prep. Ex. 2 | Y-3 [23] | [0] | [0] | 30% Aq. NaOH [2.9] | 72 | Insoluble in Ink Medium after Neutralization |
| 24 | Prep. Ex. 2 | C-3 [23] | [0] | [0] | 30% Aq. NaOH [2.9] | 87 | Insoluble in Ink Medium after Neutralization |

(Note)
The amount of each component inside parenthesis [] represents parts by weight.
*AcOH means acetic acid.

Example 1

A black ink and color inks composed of the following components were combined together to give an ink set. Each ink was prepared by mixing its components, and filtering with a microfilter having a pore size of 5 μm, to give an ink.

| [Components] | (parts by weight) |
|---|---|
| 1) Black Ink | |
| Pigment Dispersion Containing Pigment Obtained in Prep. Ex. 5 | 30 |
| (Solid Content of Colorant: 20% by weight) | |
| Glycerol | 5 |
| Ethylene Glycol | 5 |
| Acetylene Glycol-Ethylene Oxide Adduct (Surfactant) | 0.5 |
| [Commercially Available from Kawaken Fine Chemicals Co., Ltd. under the trade name of Acetylenol EH] | |
| Ion-Exchanged Water | 59.5 |
| 2) Color Ink (Magenta) | |
| Pigment Dispersion Containing Pigment Obtained in Prep. Ex. 6 | 20 |
| (Solid Content of Colorant: 20% by weight) | |
| Glycerol | 5 |
| Diethylene Glycol | 5 |
| Acetylene Glycol-Ethylene Oxide Adduct (Surfactant) | 3 |
| [Commercially Available from Kawaken Fine Chemicals Co., Ltd. under the trade name of Acetylenol EH] | |
| Ion-Exchanged Water | 67 |
| 3) Color Ink (Yellow) | |
| Pigment Dispersion Containing Pigment Obtained in Prep. Ex. 7 | 20 |
| (Solid Content of Colorant: 20% by weight) | |
| Glycerol | 5 |
| Diethylene Glycol | 5 |
| Acetylene Glycol-Ethylene Oxide Adduct (Surfactant) | 3 |
| [Commercially Available from Kawaken Fine Chemicals Co., Ltd. under the trade name of Acetylenol EH] | |
| Ion-Exchanged Water | 67 |
| 4) Color Ink (Cyan) | |

-continued

| [Components] | (parts by weight) |
|---|---|
| Pigment Dispersion Containing Pigment Obtained in Prep. Ex. 8 (Solid Content of Colorant: 20% by weight) | 20 |
| Glycerol | 5 |
| Diethylene Glycol | 5 |
| Acetylene Glycol-Ethylene Oxide Adduct (Surfactant) [Commercially Available from Kawaken Fine Chemicals Co., Ltd. under the trade name of Acetylenol EH] | 3 |
| Ion-Exchanged Water | 67 |

Examples 2 to 5 and Comparative Example 1

The same procedures as in Example 1 were carried out except that the colorants contained in the black ink and the color inks were changed to the components shown in Table 3, to give an ink set.

Next, the physical properties for the ink sets obtained in Examples 1 to 5 and Comparative Example 1 were evaluated in accordance with the following methods. The results are shown in Table 3.

<Evaluation Methods>

(1) Uniformity of Gloss

Solid images were printed with all the inks installed in the ink set in a size of 4 cm by 4 cm on photopaper having high surface smoothness commercially available from CANON SALES CO., LTD. under the trade name of professional photopaper PR-101 with a bubble jet printer commercially available from CANON INC. under the model number of BJC-430J, and a difference of gloss between the inks printed on the printouts was visually observed. The uniformity in gloss was evaluated on the basis of the following evaluation criteria.

(Evaluation Criteria)

⊚: No difference in gloss

○: Little difference in gloss

Δ: Somewhat noticeable difference in gloss (no problem for actual use)

X: Obvious difference in gloss (2) Gloss

The above-mentioned printouts were visually observed, and the gloss was evaluated as either of high glossy, glossy or mat tone (low glossy).

(3) Water Resistance of Ink

Solid image printing was carried out with a black ink on a regenerated paper for PPC by using the above-mentioned bubble jet printer described in the above item (1), and dried at 25° C. for 1 hour. Thereafter, the initial optical density was determined. Further, the printed copy paper was immersed in stand-still water for 10 seconds, and the paper was vertically lifted therefrom. After drying the paper in the air at 25° C., the optical density after immersion was determined. The residual ratio of the optical density after immersion to the initial optical density was obtained by the equation:

[Residual Ratio]=[Optical Density after Immersion]÷[Initial Optical Density]×100

The water resistance was evaluated on the basis of the following evaluation criteria:

(Evaluation Criteria)

⊚: Residual ratio being at least 95%

○: Residual ratio being at least 90% and less than 95%

Δ: Residual ratio being at least 70% and less than 90%

X: Residual ratio being less than 70%

(4) Rubbing Resistance of Ink

Solid image printing was carried out with an ink on a regenerated paper for PPC using the above-mentioned bubble jet printer described in the above item (1). After the paper was dried for 1 day at 25° C., the printed surface was strongly rubbed with a finger. The extent of rub-off of the printed image was observed with naked eyes, and evaluated on the basis of the following evaluation criteria:

(Evaluation Criteria)

⊚: Substantially no printed image being rubbed off, and its periphery being not stained.

○: Some printed images being rubbed off, and its periphery being stained a little.

X: Printed images being considerably rubbed off, its periphery being drastically blacked, and finger also being considerably stained.

(5) High Lighter-Fastness of Black Ink

Text printing was carried out with a black ink on a regenerated paper for PPC by using the above-mentioned bubble jet printer described in the above item (1). After 6 hours passed, the extent of staining of the printout sample was observed with naked eyes after being traced with an aqueous fluorescent marker commercially available from Pilot under the trade name of Spotliter S-8SL, and evaluated on the basis of the following evaluation criteria:

(Evaluation Criteria)

⊚: No stains such as rubbed stains were observed when traced with a fluorescent marker.

○: Some rubbed stains were generated when traced with a fluorescent marker, but such stains would cause no problems in practical uses.

Δ: Stains were somewhat generated when traced with a fluorescent marker.

X: Generation of rubbed stains was observed when traced with a fluorescent marker, and the stains were considerably noticeable.

TABLE 3

| Ex. No. | Colorant | Difference of Particle Diameter (nm) | Uniformity of Gloss | Gloss | Water Resistance | Rubbing Resistance | High Lighter-Fastness |
|---|---|---|---|---|---|---|---|
| 1 | Prep. Ex. 5 | 22 | ⊚ | High Glossy | ○ | ○ | Δ |
|  | Prep. Ex. 6 |  |  | High Glossy | ○ | ○ | — |
|  | Prep. Ex. 7 |  |  | High Glossy | ○ | ○ | — |
|  | Prep. Ex. 8 |  |  | High Glossy | ○ | ○ | — |
| 2 | Prep. Ex. 9 | 12 | ⊚ | High Glossy | ⊚ | ⊚ | ⊚ |
|  | Prep. Ex. 10 |  |  | High Glossy | ⊚ | ⊚ | — |
|  | Prep. Ex. 11 |  |  | High Glossy | ⊚ | ⊚ | — |
|  | Prep. Ex. 12 |  |  | High Glossy | ⊚ | ⊚ | — |

TABLE 3-continued

| Ex. No. | Colorant | Difference of Particle Diameter (nm) | Uniformity of Gloss | Gloss | Water Resistance | Rubbing Resistance | High Lighter-Fastness |
|---|---|---|---|---|---|---|---|
| 3 | Prep. Ex. 13 | 34 | ○ | Mat Tone | ⊙ | ⊙ | ⊙ |
|   | Prep. Ex. 14 |    |   | Mat Tone | ⊙ | ⊙ | — |
|   | Prep. Ex. 15 |    |   | Mat Tone | ⊙ | ⊙ | — |
|   | Prep. Ex. 16 |    |   | Mat Tone | ⊙ | ⊙ | — |
| 4 | Prep. Ex. 17 | 41 | Δ | Glossy | ⊙ | ⊙ | ⊙ |
|   | Prep. Ex. 18 |    |   | Glossy | ⊙ | ⊙ | — |
|   | Prep. Ex. 19 |    |   | Glossy | ⊙ | ⊙ | — |
|   | Prep. Ex. 20 |    |   | Glossy | ⊙ | ⊙ | — |
| 5 | Prep. Ex. 21 | 19 | ⊙ | High Glossy | ⊙ | ⊙ | ⊙ |
|   | Prep. Ex. 22 |    |   | High Glossy | ⊙ | ⊙ | — |
|   | Prep. Ex. 23 |    |   | High Glossy | ⊙ | ⊙ | — |
|   | Prep. Ex. 24 |    |   | High Glossy | ⊙ | ⊙ | — |
| Comp. Ex. No. 1 | Prep. Ex. 13 | 67 | X | Mat Tone | ⊙ | ⊙ | ⊙ |
|   | Prep. Ex. 14 |    |   | Mat Tone | ⊙ | ⊙ | — |
|   | Prep. Ex. 11 |    |   | High Glossy | ⊙ | ⊙ | — |
|   | Prep. Ex. 12 |    |   | High Glossy | ⊙ | ⊙ | — |

It can be seen from the above results that all of the ink sets obtained in Examples are excellent in uniformity of gloss, have high glossy depending upon the kind of the colorant, and are excellent in water resistance, rubbing resistance and high-lighter fastness.

The ink set of the present invention gives a printout surface uniform gloss even when printed on a smooth surface medium. Moreover, the ink set exhibits high glossy and is excellent in water resistance, rubbing resistance and high-lighter fastness even when the ink is water-based. Therefore, the ink set can be suitably used as an ink set for inkjet recording.

What is claimed is:

1. An ink set comprising (A) a black ink comprising a water-insoluble colorant for a black ink and (B) a color ink comprising a water-insoluble colorant for a color ink, wherein the difference between the maximum average particle diameter and the minimum average particle diameter of the colorants contained in the water-insoluble colorant for a black ink and the water-insoluble colorant for a color ink is at most 25 nm; wherein said water-insoluble colorant for a black ink and said water-insoluble colorant for a color ink are each independently an aqueous dispersion of water-insoluble polymer particles containing a pigment or a hydrophobic dye; and said water-insoluble polymer is a water-insoluble vinyl polymer prepared by copolymerizing a monomer composition comprising a monomer having a salt-forming group, a hydrophobic monomer and a macromer.

2. The ink set according to claim 1, wherein an average particle diameter of the water-insoluble colorant for black ink and the water-insoluble colorant for black ink is within a range of 10 to 200 nm.

3. The ink set of claim 1, wherein said water-insoluble colorant for a black ink is a water-insoluble vinyl polymer prepared by copolymerizing a monomer composition further comprising a nonionic hydrophilic monomer.

4. The ink set of claim 1, wherein said water-insoluble colorant for a color ink is a water-insoluble vinyl polymer prepared by copolymerizing a monomer composition further comprising a nonionic hydrophilic monomer.

5. The ink set of claim 1, wherein said water-insoluble colorant for a black ink comprises a macromer having a number-average molecular weight of 500–100,000.

6. The ink set of claim 1, wherein said water-insoluble colorant for a color ink comprises a macromer having a number-average molecular weight of 500–100,000.

7. The ink set of claim 1, wherein said water-insoluble colorant for a black ink comprises a macromer which is a styrenic macromer.

8. The ink set of claim 1, wherein said water-insoluble colorant for a color ink comprises a macromer which is a styrenic macromer.

9. The ink set of claim 1, wherein said water-insoluble colorant for a black ink has a content of said monomer having a salt-forming group of 1–50% by weight.

10. The ink set of claim 1, wherein said water-insoluble colorant for a color ink has a content of said monomer having a salt-forming group of 1–50% by weight.

11. The ink set of claim 1, wherein said water-insoluble colorant for a black ink has a content of said hydrophobic monomer of 5–93% by weight.

12. The ink set of claim 1, wherein said water-insoluble colorant for a color ink has a content of said hydrophobic monomer of 5–93% by weight.

13. The ink set of claim 1, wherein said water-insoluble colorant for a black ink has a content of said macromer is up to 30% by weight.

14. The ink set of claim 1, wherein said water-insoluble colorant for a color ink has a content of said macromer is up to 30% by weight.

15. The ink set of claim 1, wherein said water-insoluble colorant for a black ink is comprised of a water-insoluble polymer having a weight-average molecular weight of 1,000–1,000,000.

16. The ink set of claim 1, wherein said water-insoluble colorant for a color ink is comprised of a water-insoluble polymer having a weight-average molecular weight of 1,000–1,000,000.

* * * * *